United States Patent [19]

Reamey

[11] Patent Number: 5,328,580
[45] Date of Patent: Jul. 12, 1994

[54] ELECTRODEPOSITION METHOD OF APPLYING ENCAPSULATED LIQUID CRYSTAL MATERIAL TO ELECTRODES

[75] Inventor: Robert H. Reamey, Palo Alto, Calif.

[73] Assignee: Raychem Corporation, Menlo Park, Calif.

[21] Appl. No.: 105,658

[22] Filed: Aug. 12, 1993

Related U.S. Application Data

[63] Continuation of Ser. No. 865,435, Apr. 9, 1992, abandoned.

[51] Int. Cl.$^5$ .................. C25D 13/04; C25D 13/08
[52] U.S. Cl. ........................ 204/181.1; 204/72; 204/180.2; 204/181.4; 204/181.6; 204/181.7; 205/109; 205/122; 205/136
[58] Field of Search .............. 204/72, 180.2, 181.1, 204/181.4, 181.6, 181.7; 205/109, 118, 122, 136

[56] References Cited

U.S. PATENT DOCUMENTS

| | | | |
|---|---|---|---|
| 4,522,691 | 6/1985 | Suginoya et al. | 204/18.1 |
| 4,639,088 | 1/1987 | Suginoya et al. | 350/399 F |
| 4,662,720 | 5/1987 | Fergason | 350/339 F |
| 4,670,188 | 6/1987 | Iwasa et al. | 252/513 |
| 4,684,218 | 8/1987 | Aizawa et al. | 350/339 F |
| 4,704,559 | 11/1987 | Suginoya et al. | 315/169.1 |
| 4,709,990 | 12/1987 | Oans | 350/339 F |
| 4,781,444 | 11/1988 | Suginoya et al. | 350/357 |
| 4,787,716 | 11/1988 | Kato et al. | 350/357 |
| 4,812,387 | 3/1989 | Suzuki et al. | 430/311 |
| 4,834,508 | 5/1989 | Fergason | 350/339 F |
| 4,853,092 | 8/1989 | Matsumura et al. | 204/18.1 |
| 4,873,175 | 10/1989 | Suzuki et al. | 430/311 |
| 4,878,741 | 11/1989 | Fergason | 350/339 F |
| 4,902,592 | 2/1990 | Matsumura et al. | 430/7 |
| 4,953,953 | 9/1990 | Fergason | 350/339 F |
| 4,992,201 | 2/1991 | Peralman | 252/299.1 |
| 4,999,094 | 3/1991 | Kamamori et al. | 204/180.2 |

FOREIGN PATENT DOCUMENTS

WO90/05429  5/1990  PCT Int'l Appl. ............. H04N 9/31

OTHER PUBLICATIONS

Ivashchenko et al., Mol. Cryst. Liq. Cryst., 150A, pp. 1–168 (1987).
Suginoya et al., Proceedings of the Symposium on Electrochemical Technology in Electronics, vol. 88-23, pp. 309–323 (1987).
Suginoya et al., J. Electrochem. Soc., 137 (12), pp. 3761–3769 (1990).
Derwent Abstract WPI 92-263746/32 (abstract of JP 4-179918 (Seiko Epson) (1992)).
Chem Abstracts 79(10):54947p (abstract of Ukr. Khim. Zh. (Russ. Ed.) 39(4), pp. 400–401 (1973)).
Chem Abstracts 85(24):179056c (abstract of Ukr. Khim. Zh. (Russ. Ed.), 42(8), pp. 852–856 (1976)).
Chem. Abstracts 89(18):148203b (abstract of Izv. Sev.-Kauk. Nauchn. Tsentra Vyssh. Shk., Ser. Tekh. Nauk. 6(1), pp. 83–86 (1978)).
Chem Abstracts 92(24):199841c (abstract of Zn. Prikl. Khim. (Leningrad), 53(3), pp. 689–699 (1980)).
Chem Abstracts 107(10):79510a (abstract of Puti Po- (List continued on next page.)

Primary Examiner—John Niebling
Assistant Examiner—William T. Leader
Attorney, Agent, or Firm—Herbert G. Burkard; Yuan Chao

[57] ABSTRACT

Encapsulated liquid crystal is deposited onto an electrode by providing a substrate having an electrode pattern thereon; placing the substrate and the electrode pattern in contact with an electrodeposition medium comprising a liquid crystal composition, a containment medium or precursor therefor, and optionally a carrier medium; and depositing encapsulated liquid crystal material comprising the liquid crystal composition dispersed in the containment medium onto the electrode pattern or selected portions thereof by applying a voltage to the electrode pattern or selected portions thereof. The coated substrate-electrode combination can then be made into displays, privacy screens, signs, architectural partitions, and the like.

16 Claims, 3 Drawing Sheets

OTHER PUBLICATIONS wysh. Kachestvai Metody Kontorlya Ekspluat. Svoistv Lakokrasoch. Mater. Semin., M, pp. 35-39 (1986)).

Usmani, Polym. Plast. Technol. Eng. 15(2), pp. 115-135 (1980).

Schenck et al., J. Oil Col. Chem. Assoc. 63, pp. 482-491 (1980).

Pierce, J. Coatings Technol. 53 (672), pp. 52-67 (1981).

Beck, Electrochimca Acta 33(7), pp. 839-850 (1988).

Okazaki, Transactions of the IEICE, vol. E 71, No. 11, pp. 1077-1079 (1988).

Eliseeva et al., Progress in Org. Coatings, 17, pp. 251-275 (1989).

Vidusek, Circuit World 15(2), pp. 6-10 (1989).

Kordomenos et al., J. Coating Technol. 54 (686), pp. 33-41 (1982).

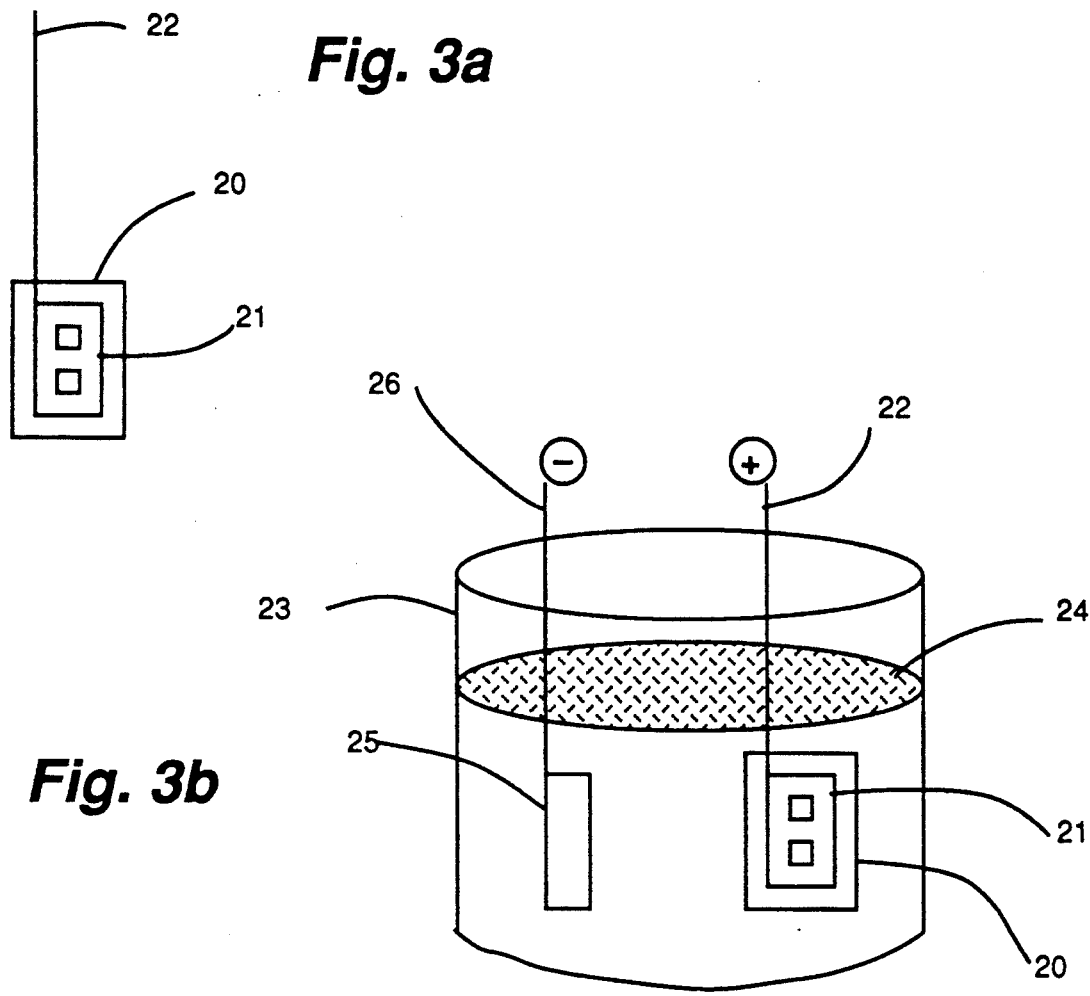

ELECTRODEPOSITION METHOD OF APPLYING ENCAPSULATED LIQUID CRYSTAL MATERIAL TO ELECTRODES

This application is a continuation of application Ser. No. 07/865,435, filed Apr. 9, 1992, now abandoned.

TECHNICAL FIELD OF THE INVENTION

This invention relates to a method of applying encapsulated liquid crystal material to electrode surfaces by electrodeposition.

BACKGROUND OF THE INVENTION

Liquid crystal displays ("LCD's") and other devices in which the electro-optically active element comprises liquid crystal material are well known.

One type of device employs an encapsulated liquid crystal structure in which a liquid crystal composition is encapsulated or dispersed in a containment medium such as a polymer. When a voltage corresponding to a sufficiently strong electric field is applied via an electrode across the encapsulated liquid crystal structure (the "field-on" condition), the alignment of the liquid crystal molecules therein is re-oriented in accordance with the field, so that incident light is transmitted. Conversely, in the absence of such a voltage (the "field-off" condition) the alignment of the liquid crystal molecules is random and/or influenced by the liquid crystal-matrix interface, so that the structure scatters and/or absorbs incident light. The applied voltage at which the structure changes from its field-off condition to its field-on condition is generally referred to as the threshold voltage. Such devices can be used in displays, architectural partitions, automobile sun-roofs, privacy screens, and signs.

Generally, the encapsulated liquid crystal material is applied to a substrate-electrode combination in a fluid, spreadable precursor form and allowed to convert to its final form by evaporation of a solvent or carrier medium, by a chemical reaction such as polymerization, or by a physical change such as solidification upon cooling. An alternative method is to prepare a film or sheet of encapsulated liquid crystal material and then laminate it to the substrate-electrode combination.

Fergason, U.S. Pat. No. 4,435,047 (1984), discloses making an encapsulated liquid crystal device by preparing an emulsion comprising liquid crystals, a containment medium, and a carrier medium, laying a layer of the emulsion onto a substrate-supported electrode, and allowing the emulsion to dry.

Doane et al., U.S. Pat. No. 4,688,900 (1987), discloses the preparation of encapsulated liquid crystal devices by applying a combination of unpolymerized containment medium precursor monomer and liquid crystal onto a substrate/electrode and polymerizing the monomer.

West et al., U.S. Pat. No. 4,685,771 (1987), discloses the preparation of encapsulated liquid crystal devices by a solvent- or temperature-induced phase separation technique.

The prior art methods have a number of limitations. It is difficult to selectively coat only the portions of the device which are actually electro-optically active, i.e., where the electrode material is present, so that in practice almost the entire substrate is coated. Where the electrode pattern is intricate but relatively small in terms of over-all area, a large proportion of the encapsulated liquid crystal material is effectively wasted. They cannot conveniently apply different types of encapsulated liquid crystal materials to different areas of the electrode/substrate combination, for example in making colored displays. Where the substrate is not planar, for example, in automobile sunroofs or certain architectural applications, it is difficult to coat.

I have discovered a new method of applying encapsulated liquid crystal material to electrodes which overcomes the foregoing limitations.

SUMMARY OF THE INVENTION

This invention provides a method of applying encapsulated liquid crystal material to an electrode material, comprising the steps of:

providing a substrate having an electrode pattern thereon;

placing the substrate and the electrode pattern in contact with an electrodeposition medium comprising a liquid crystal composition, a containment medium or precursor therefor, and optionally a carrier medium; and depositing encapsulated liquid crystal material comprising the liquid crystal composition dispersed in the containment medium onto the electrode pattern or selected portions thereof by applying a voltage to the electrode pattern or selected portions thereof.

After the electrodeposition process, the substrate may be removed from the electrodeposition medium, the excess medium may be rinsed off, and the carrier medium (if any) may be allowed to evaporate.

BRIEF DESCRIPTION OF THE DRAWING(S)

FIG. 1 and 2 show schematically the operation of a device comprising an encapsulated liquid crystal structure.

FIGS. 3a–c show how an electrode on a substrate can be selectively coated.

FIGS. 4a–d show how pixels of different colors can be selectively electrodeposited to make a color display.

DESCRIPTION OF THE PREFERRED EMBODIMENTS

Figure 1:
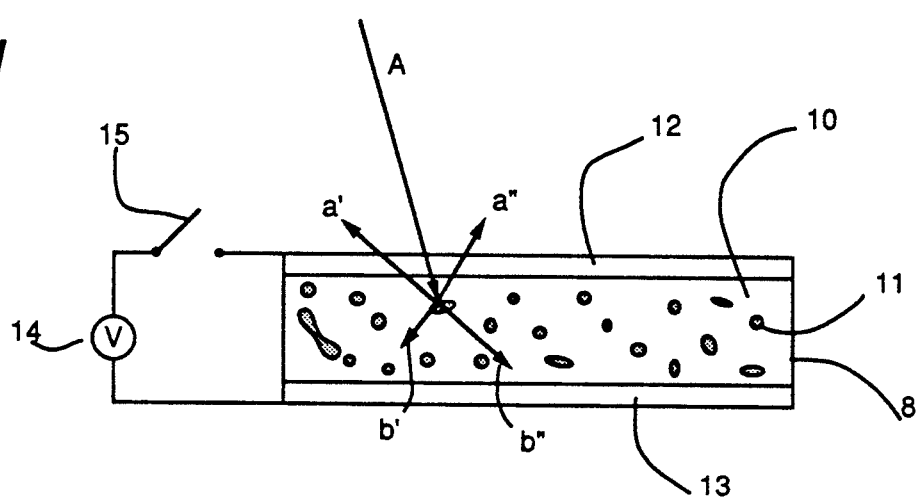

Encapsulated liquid crystal structures and their preparation are disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987), to West et al.; U.S. Pat. No. 4,688,900 (1987) to Doane et al.; and published European patent application EP 0,313,053 (1989), by Dainippon Ink and Chemicals; the disclosures of which are incorporated herein by reference. In an encapsulated liquid crystal structure, discrete volumes of a liquid crystal composition are encapsulated, dispersed, embedded or otherwise contained in a containment medium or matrix. The volumes are not necessarily limited to spherical or substantially spherical ones. They may be irregularly shaped, and even interconnected. The amount of interconnection between volumes may be to an extent such that the liquid crystals appear to form a continuous phase, as described in the aforementioned EP 0,313,053. "Liquid crystal composition" denotes a composition having liquid crystalline properties, whether that composition consists of a single discrete liquid crystalline compound, a mixture of different liquid crystalline compounds, or a mixture of liquid crystalline and non-liquid crystalline compounds. In a preferred embodiment, the liquid crystal composition is nematic or operationally nematic, more preferably also having a positive dielectric anisotropy. In another preferred embodiment, the liquid crystal composition is operationally smectic. In yet another preferred embodiment, the liquid crystal composition is chiral nematic.

Individual liquid crystal molecules typically have elongated shapes, with a tendency to align or orient themselves with their long molecular axes parallel to each other. This alignment causes a liquid crystal composition to be anisotropic, meaning that its measured physical, optical, and other properties are dependent on the direction of measurement (parallel or perpendicular to the direction of alignment). Further, the alignment direction can be influenced by an external stimulus, such as an electrical or magnetic field, causing the liquid crystal composition to exhibit a particular value of a physical characteristic in one direction when the stimulus is absent, but rapidly switching to a different value when the stimulus is applied. It is because of this anisotropy and its ready realignment that liquid crystal compositions are useful as materials for displays.

A preferred electrodeposition medium comprises the liquid crystal composition and the containment medium emulsified in the presence of a carrier medium, which in turn is preferably an aqueous medium, for example water. Additives for facilitating emulsification or improving emulsion stability or performance may optionally be added. The emulsion is applied to the substrate or electrode, and the carrier medium is removed, leaving behind the encapsulated liquid crystal structure.

The containment medium for encapsulated liquid crystal structures is preferably a polymeric material. Suitable containment media include but are not limited to gelatin, polyurethane, poly(ethylene oxide), poly(vinyl pyrrolidone), cellulosic polymers, natural gums, acrylic and methacrylic polymers and copolymers, epoxies, polyolefins, vinyl polymers, and the like. Polyurethane latexes, such as described in Pearlman, U.S. Pat. No. 4,992,201 (1991), the disclosure of which is incorporated herein by reference, are preferred containment media.

Typically, an encapsulated liquid crystal structure is substantially non-transparent in the absence of a sufficient electric field (the "field-off" state) and substantially transparent in the presence of a sufficient electric field (or "field-on" state). The electric field induces a change in the alignment of the liquid crystal molecules in the liquid crystal composition, in turn causing the encapsulated liquid crystal structure to switch from a highly light-scattering (and/or absorbent) state to a highly non-scattering and substantially transparent state. Generally, it is preferred that the liquid crystal composition have a positive dielectric anisotropy and that the ordinary index of refraction of the liquid crystal composition be matched with the index of refraction of the containment medium, while the extraordinary index of refraction is substantially mismatched therewith. These principles are further described in the aforementioned references, particularly the patents to Fergason. There is further scattering which may occur due to the different liquid crystal alignments in neighboring droplets. If this is the dominant mode of scattering, the requirement for refractive index matching may be relaxed. In those portions of the encapsulated liquid crystal structure to which a sufficient electric field is applied, the transition from a non-transparent state to a transparent state occurs, while adjacent areas to which no electric field has been applied remain nontransparent.

Figure 2:
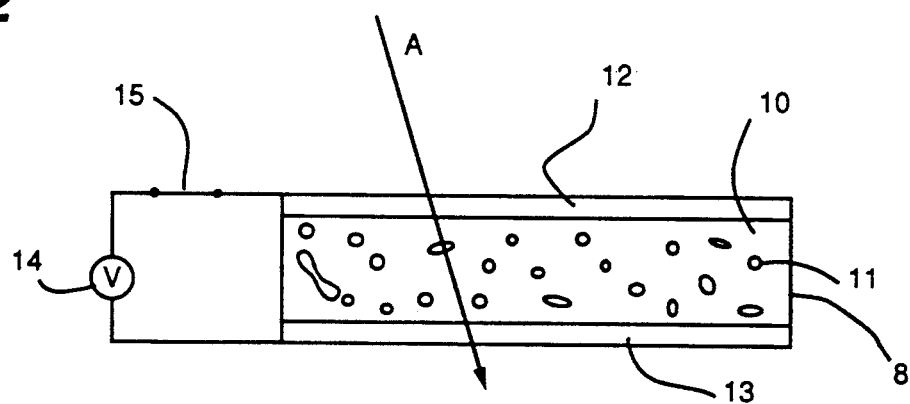

These principles are illustrated in FIGS. 1 and 2 (like numerals referring to like elements). Encapsulated liquid crystal structure 8 comprises a containment medium 10 having distributed therein plural volumes of liquid crystal composition 11 and is positioned between top and bottom electrodes 12 and 13, made for example of indium tin oxide ("ITO") or a thin metal coating. A voltage source 14 is connected to electrodes 12 and 13, but with switch 15 in the open position (FIG. 1), no voltage is applied across encapsulated liquid crystal material 8. Incident light (ray A) is scattered, both backward (rays a' and a") and forward (b' and b"). When switch 15 is closed (FIG. 2), a voltage is applied across encapsulated liquid crystal material 8, causing molecules in liquid crystal composition 11 to align their long molecular axes with the field of the applied voltage. Owing to the match between the index of refraction of containment medium 10 and the ordinary index of refraction of liquid crystal composition 11, incident light (ray A) is not scattered, but is transmitted through encapsulated liquid crystal structure 8.

The method of the present invention is illustrated in FIGS. 3a–c. FIG. 3a depicts a substrate 20 (e.g., glass or poly(ethylene terephthalate)) onto which a figure-eight electrode pattern 21 has been coated. Lead 22 provides a means for applying a voltage to electrode 21. Electrode 21, may be made of a transparent conductive material, such as ITO. Where electrode 21 is to be the backplane electrode of a display operating in the reflective mode, so that transparency is not a requirement, it may be made of a metal such as aluminum, gold, silver, or copper. FIG. 3b shows the substrate-electrode combination of FIG. 3a immersed in a container 23 containing electrodeposition medium 24. A counterelectrode 25 (e.g., platinum) having a respective lead 26 is also immersed in emulsion 24. A voltage is applied across electrodes 25 and 21. While in this instance electrode 21 is depicted as the anode and electrode 25 is depicted as the cathode, the opposite polarity may be employed. After a suitable time, the voltage is turned off, the substrate-electrode combination 20–21 is removed from container 23, and rinsed to removed excess electrodeposition medium 24. After the carrier medium (if any) is removed by drying, one obtains a substrate-electrode combination 20–21 in which only electrode 21 is coated with encapsulated liquid crystal material 24'. In constrast, in a conventional coating process, it would have been much less convenient to selectively coat only the electroded portions of substrate 20. The coated substrate-electrode combination can now be laminated with an oppositely-faced substrate-electrode combination, to produce a sandwich construction such as shown in FIGS. 1–2.

Pleochroic dyes may be mixed with liquid crystals to form a solution therewith, to make colored displays and other devices. The molecules of pleochroic dyes generally align with the molecules of liquid crystals, so that the application of the electric field affects not only the predominant alignment of the liquid crystals, but also of the pleochroic dye. As the extent of the absorption of incident light by the pleochroic dye depends on its orientation relative to the incident light, the application of an external stimulus to a liquid crystal-pleochroic dye combination provides a mechanism for the controlled attenuation of light by absorption. A display capable of displaying colored images can be formed by depositing side by side red, blue, and green pixels made from encapsulated liquid crystal structures of the corresponding color. In some embodiments, the pleochroic dye may also be present in the containment medium.

Isotropic dyes can also be used. The isotropic dye may reside in the containment medium, in the liquid crystal composition, or in both. An isotropic dye does not change its alignment with an applied electric field, but instead acts as a static color filter. It is also possible to use a combination of isotropic and pleochroic dyes. The use of isotropic (also called non-pleochroic) dyes is discussed more specifically in Fergason, U.S. Pat. No. 4,878,741 (1989), the disclosure of which is incorporated herein by reference. (Thus, as used herein, the term "liquid crystal composition" also means, in context, a liquid crystal composition containing pleochroic or isotropic dye dissolved therein.)

Figure 4A:
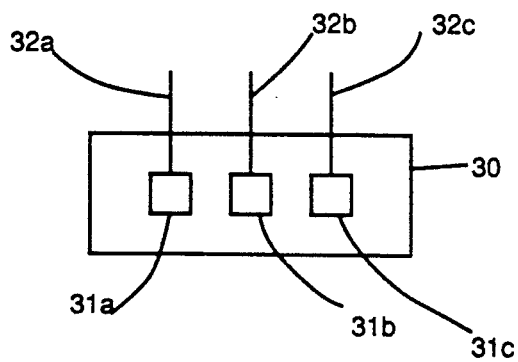
Figure 4B:
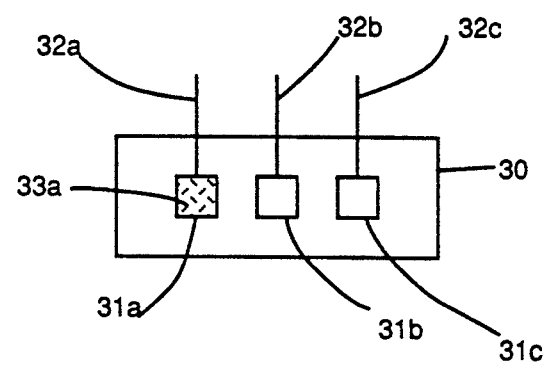
Figure 4C:
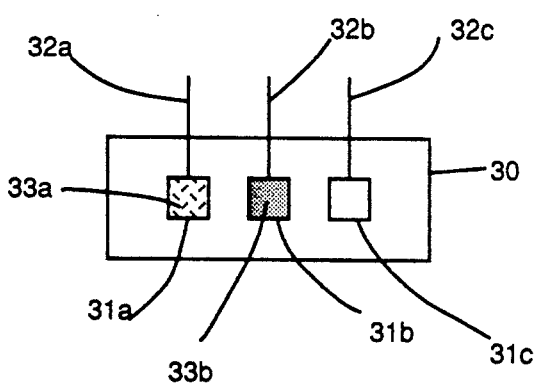
Figure 4D:
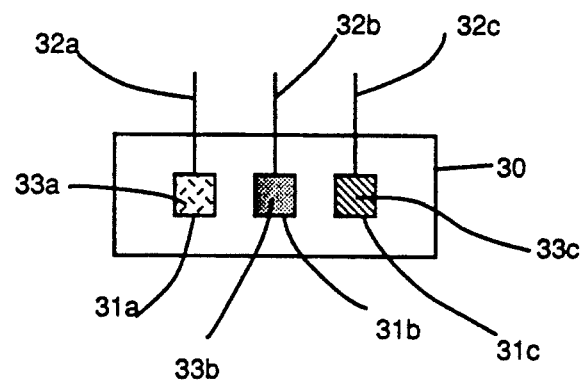

The present invention is particularly well adapted for the preparation of colored displays, as shown in FIGS. 4a–d. FIG. 4a shows a substrate 30 having on a surface thereof an array of electrodes 31a–c, corresponding to differently colored pixels (e.g., red, blue, and green, respectively). Each of electrodes 31a–c can be selectively powered via a respective electrical lead 32a–c. Electrode 31a can be selectively powered and coated with a red encapsulated liquid crystal composition 33a following the procedure described in FIGS. 3a–c above, leading to the intermediate structure of FIG. 4b. Next, electrode 31b is selectively powered and coated with blue encapsulated liquid crystal composition 33b, to produce the second intermediate structure of FIG. 4c. Finally, electrode 31c is selectively powered and coated with green encapsulated liquid crystal composition 33c, to produce the final structure of FIG. 4d, having red, blue, and green pixels deposited side-by-side. In a conventional coat-and-dry or lamination process, it would be extremely difficult to produce such side-by-side differently colored pixels, especially in high resolution displays where the number of pixels can number in the millions and the separation between adjacent pixels is very small.

Electrodeposition has a number of additional advantages over the prior art. It is not as sensitive to wetting, spreading, and flow instability as conventional coating techniques such as doctor-blade coating, slot-die coating, and printing. Electrodeposited coatings are less likely to have the coating defects such as fish-eyes, craters, waviness, and mechanical chatter marks which afflict other coating techniques. This method is especially suitable for applying a conformal coating onto electrodes which are non-planar, either because of inherent manufacturing limitations or by design. Thus lenses and automobile sun or moon roofs and other curved or three-dimensional objects can be coated.

The electrodeposition method of this invention can be performed either in a batchwise fashion in which each substrate or batch of substrates is sequentially placed into the emulsion to be coated or in a continuous fashion in which, for example, a roll of substrate is continuously passed through the emulsion while current is passed.

One embodiment of this invention involves the use of ionically stabilized aqueous based polymers which can be electro-coated onto an electrode. When an emulsion of liquid crystal in an aqueous latex is electrodeposited onto the electrode, the liquid crystal droplets (or volumes) become incorporated into the deposited film. A liquid crystal emulsion in a latex containing carboxylic (negatively charged) ionic groups will tend to deposit onto the anode where protons are generated, neutralizing the stabilizing carboxylic groups. An emulsion containing protonated amine (positively charged) groups will tend to deposit on the cathode where hydroxide ions are generated. In some cases, coating on the cathode is preferred. For example, with metal electrodes, cathodic electrodeposition can result in less electrode corrosion. With oxide containing electrodes such as indium tin oxide, anodic electro-deposition can result in less corrosion. One skilled in the art can adjust these parameters in order to maximize device performance and eliminate electrode corrosion. This embodiment may be viewed as an electroprecipitation embodiment, because an already polymeric containment medium is deposited onto the electrode.

Yet another embodiment utilizes electrodeposition due to bond-forming reactions at the electrode resulting in electropolymerization rather than electroprecipitation. Specific polymer systems which can undergo electropolymerization to form encapsulated liquid crystal films at the electrode include epoxies and acrylic systems. In an electropolymerization process, the electrodeposition medium comprises the liquid crystal composition and a precursor material (e.g., a monomer or oligomer) for the containment medium, which precursor material polymerizes and deposits as the polymeric containment medium on the electrode. Because the precursor material is commonly a low viscosity material, it may also function as a carrier medium, thereby obviating the need for a separate carrier medium.

In all the above embodiments, crosslinkers can be included in order to improve the properties of the containment medium and the resulting device.

Generally, a voltage of between about 1 and about 100 volts is sufficient to effect deposition. The time required is normally between about 1 sec and about 20 min. The current flow and voltage can be adjusted to improve coating quality. The electrodeposition can be performed at constant current, constant voltage, or in a pulsed mode. Those skilled in the art will be able to readily determine the combinations of time, current, and voltage which are most suitable for a particular containment medium and liquid crystal composition.

The practice of this invention can be further understood by reference to the following examples, which are provided by means of illustration and not of limitation.

EXAMPLE 1

An emulsion of liquid crystal (ZLI-1840, E. Merck, Darmstadt, Germany) was formed in an aqueous polyurethane latex (XR9677, ICI Americas, 40 weight % in water) by propeller blade agitation. Approximately 2 g of the emulsion was diluted to about 20 g with water. An ITO coated glass substrate and a platinum electrode were immersed into the emulsion. A voltage of 100 V was applied for 3 min. The ITO was biased positively (anode). An opaque film electrodeposited into the ITO coated glass substrate. The sample was removed and rinsed with water, allowed to dry, and a piece of ITO-coated glass was laminated on top of it. The sample showed the voltage dependent clearing effect characteristic of encapsulated liquid crystal films.

EXAMPLE 2

An emulsion of liquid crystal (5 g, ZLI-1840) in aqueous polyurethane latex (XR9677, 40 weight % in water) containing 0.1 weight % fluorosurfactant (Zonyl FSN) was transferred into a 20 mL vial. It was diluted with an equal amount of water to give about 10 mL total volume. A platinum electrode and a glass substrate coated with an ITO pattern were immersed into the vial. A galvanostat was used to pass a constant current of 2 mA such that the ITO pattern was positive with respect to the platinum electrode. After about 20 sec the current was stopped. The ITO coated glass substrate was removed and rinsed with water, leaving a coating of encapsulated liquid crystal material only where the ITO pattern was. The coating was allowed to dry for about 1 hr. A piece of ITO coated glass was laminated on top. The sample became clear when a voltage was applied.

EXAMPLE 3

An ITO coated polyester film which had an electrode pattern was immersed into an emulsion as described in Example 2. A current of 2 mA was passed for about 15 sec with the ITO coated polyester as the anode and the platinum as the cathode. The polyester film was removed from the emulsion and the excess emulsion rinsed off, leaving behind an encapsulated liquid crystal film whose shape conformed to that of the electrode pattern. The film was allowed to dry for 30 min after which another piece of ITO-coated polyester film was laminated on top. The coated portions of the polyester film cleared when a voltage was applied.

EXAMPLE 4

An ITO/glass substrate was electrically attached to a galvanostat and lowered into an emulsion of the liquid crystal (E49, Merck Ltd., United Kingdom) containing a black pleochroic dye mixture (1.6 weight %, S344, Mitsui Toatsu Co., Japan) in polyurethane latex (Neorez R9677) in water. Also present in the emulsion was a platinum foil counter electrode to act as the cathode. A constant current of 2 mA was applied for approximately 30 sec, after which the substrate was removed and rinsed with water. The excess water was patted off with a paper towel and the coated substrate was allowed to dry for 1 hr in a laminar flow hood. The coating was of good quality—it was very even and contained few cosmetic defects. The sample was 13.2 microns thick and went from dark and scattering to light and clear on application of a 44 V AC signal after laminating with an ITO coated topsheet.

EXAMPLE 5

An electrode pattern with 7 independently addressable picture elements was etched into an ITO/glass substrate. Four of the picture elements were connected to a galvanostat, and the substrate was lowered into an emulsion of liquid crystal (E49), containing a black pleochroic dye mixture (1.6 weight %, S344) in polyurethane latex (Neorez R9677) in water. Also immersed in the emulsion was a platinum foil counter electrode to act as the cathode. A constant current of 2 mA was applied for about 20 sec after which the electrode was removed and rinsed with water. The remaining 3 picture elements were attached to the galvanostat and the substrate was lowered into an emulsion of liquid crystal material (E49) containing no dye in the same polyurethane latex material. A constant current of 2 mA was again applied for about 20 sec after which the substrate was removed and rinsed with water. The excess water was patted off the coated substrate, which was then allowed to dry for 1 hr in a laminar flow hood. A second piece of ITO/glass was laminated on top of the coating. The resulting display had 4 black picture elements and 3 white picture elements which could be switched on and off independently by the application of the appropriate voltage.

What is claimed is:

1. A method of applying encapsulated liquid crystal material to an electrode material, comprising the steps of:

providing a substrate having an electrode pattern thereon;

placing the substrate and the electrode pattern in contact with an electrodeposition medium comprising a liquid crystal composition, a containment medium or precursor therefor, and optionally a carrier medium; and depositing encapsulated liquid crystal material comprising discrete volumes of the liquid crystal composition encapsulated, dispersed, embedded, or otherwise contained in the containment medium onto the electrode pattern or selected portions thereof by applying a voltage to the electrode pattern or selected portions thereof; the encapsulated liquid crystal structure being capable of switching from a highly light scattering state to a highly non-scattering and substantially transparent state upon the application of a sufficient electric field.

2. A method according to claim 1, wherein the electrodeposition medium comprises a liquid crystal composition emulsified in a latex containment medium.

3. A method according to claim 2, wherein the latex is a polyurethane latex.

4. A method according to claim 1, wherein the liquid crystal composition is operationally nematic and has a positive dielectric anisotropy.

5. A method according to claim 1, wherein the liquid crystal composition is operationally smectic.

6. A method according to claim 1, wherein the liquid crystal composition is chiral nematic.

7. A method according to claim 1, wherein a positive voltage is applied to the electrode pattern or selected portions thereof.

8. A method according to claim 1, wherein a negative voltage is applied to the electrode pattern or selected portions thereof.

9. A method according to claim 1, wherein the emulsion further comprises a dye dissolved in the liquid crystal composition.

10. A method according to claim 9, wherein the dye is a pleochroic dye.

11. A method according to claim 9, wherein the dye is an isotropic dye.

12. A method according to claim 9, wherein the dye is a combination of a pleochroic dye and an isotropic dye.

13. A method according to claim 9, wherein the sequence of immersing and depositing steps is repeated at least once with an electrodeposition medium containing a different dye and a voltage is applied to different portions of the electrode pattern in the repeated immersingdepositing sequence, to deposit at least two encapsulated liquid crystal materials of different colors to different portions of the electrode pattern.

14. A method according to claim 13, wherein pixel arrays of red, green, and blue encapsulated liquid crystal material are deposited.

15. A method according to claim 1, wherein the encapsulated liquid crystal material is deposited by an electroprecipitation process.

16. A method according to claim 1, wherein the encapsulated liquid crystal material is deposited by an electropolymerization process.

* * * * *